United States Patent [19]

Vulikh et al.

[11] 4,056,605

[45] Nov. 1, 1977

[54] METHOD FOR PURIFICATION OF HYDROFLUORIC ACID

[76] Inventors: Alexandr Ilich Vulikh, ulitsa Khalturina, 5ª, kv. 93; Maina Konstantinovna Zagorskaya, ulitsa Khalturina, 5ª, kv. 93, both of Ryazan; Izrail Zalmanovich Kofman, ulitsa Bazhova, 8, kv. 5, Sverdlovskaya oblast, Polevskoi; Inna Vasilievna Pavlovich, ulitsa Kultury, 12, kv. 7, Sverdlovskaya oblast, Polevskoi; Boris Veniaminovich Levitan, ulitsa Kultury, 10, kv. 14, Sverdlovskaya oblast, Polevskoi; Nikolai Vasilievich Troyan, ulitsa Kultury, 10, kv. 10, Sverdlovskaya oblast, Polevskoi; Sergei Viktorovich Dubyaga, ulitsa Karla Marxa, 7, kv. 7, Sverdlovskaya oblast, Polevskoi, all of U.S.S.R.

[21] Appl. No.: 744,296

[22] Filed: Nov. 23, 1976

[51] Int. Cl.$^2$ .......................... C01B 7/22; C01C 1/24; C01B 33/00
[52] U.S. Cl. .................................. 423/484; 423/488; 423/341; 423/545
[58] Field of Search .............. 423/488, 484, 483, 545, 423/341

[56] References Cited

U.S. PATENT DOCUMENTS 3,383,324   5/1968   Hiwatashi ..................... 423/484 X

FOREIGN PATENT DOCUMENTS 1,953,970   5/1971   Germany ........................... 423/483

OTHER PUBLICATIONS

Chem. Abstracts, vol. 70, 1969, p. 113, Item 116678b.

*Primary Examiner*—Edward Stern
*Attorney, Agent, or Firm*—Steinberg & Blake

[57] ABSTRACT

A method for purification of hydrofluoric acid from silicofluoric acid and/or sulphuric acid which comprises contacting a mixture of said acids with an anion-exchange resin in the fluoride form. As a result, a purified hydrofluoric acid is obtained. The exhausted anion-exchange resin is treated with a regenerating solution which comprises an aqueous solution of ammonium fluoride with a concentration within the range of from 2 to 10% by weight and having a pH value ranging from 6 to 9.

The method according to the present invention is technologically simple; it enables the use of tightly sealed and safe equipment; requires minimal operation costs and eliminates the formation of production wastes.

7 Claims, No Drawings

METHOD FOR PURIFICATION OF HYDROFLUORIC ACID

The present invention relates to methods for purification of hydrofluoric acid. More particularly it relates to removing such impurities as sulphuric and/or silicofluoric acid from hydrofluoric acid.

The hydrofluoric acid is useful as a starting product in the production of synthetic cryolite and aluminum fluoride; it is also widely used in organic synthesis, for etching of ceramic and metallic materials, in the preparation of pure fluorides.

In the preparation of hydrofluoric acid by way of decomposition of fluorites or other fluorine-containing raw materials, transferred into the gaseous phase, in addition to hydrogen fluoride, there is also the total amount of silicon contained in the starting stock, in the form of silicon tetrafluoride as well as sulphuric anhydride and sulphuric acid. Upon absorption with water all these substances are absorbed and the resulting solution of hydrofluoric acid contains impurities of silicofluoric and sulphuric acids.

As a result of such treatment of the starting fluoric concentrate, the hydrofluoric acid produced contains, generally, 30 to 40% by weight of HF, 1 to 10% by weight of $H_2SiF_6$ (depending on the content of $SiO_2$ in the concentrate), 0.5 to 2% by weight of sulphuric acid. The total amount of $H_2SO_4+$ $+H_2SiF_6$ usually ranges from 2 to 6% by weight.

To be suitable for further use, such absorption-prepared acid should be more or less deeply purified from impurities of $H_2SiF_6$ and $H_2SO_4$.

To be employed in its major application field, i.e. production of synthetic cryolite and aluminum fluoride, the purified hydrofluoric acid should contain ($H_2SiF_6$ + $H_2SO_4$) no more than 0.5–1.0% by weight; in other applications such as organic synthesis, etching of ceramic and metallic materials, production of pure fluorides even a deeper purification is required.

The problem of separation of hydrofluoric, silicofluoric and sulphuric acids is also encountered in applications contemplating the use of hydrofluoric acid for etching of glass and other materials containing silicon or silica. The exhausted, in etching, hydrofluoric acid also contains silicofluoric and sulphuric acids. To recycle the hydrofluoric acid back into the process, it is necessary to separate said acids.

Prior art methods for purification of absorptional or waste hydrofluoric acid commercially employed hitherto involve stages of chemical purification, distillation and rectification in various combinations.

Removal of a portion of $H_2SiF_6$ (in the case where the content thereof in hydrofluoric acid is above 1% by weight) is achieved by precipitation according to the following scheme:

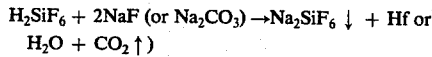

However, the thus-obtained purified hydrofluoric acid contains about 1% by weight of $Na_2SiF$ and a certain amount of NaF. Sulphuric acid is removed by way of precipitation as $BaSO_4$ according to the following scheme;

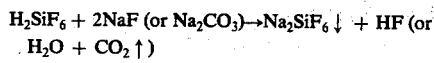

However, the thus-obtained purified hydrofluoric acid contains about 1% by weight of $Na_2SiF_6$ and a certain amount of NaF. Sulphuric acid is removed by way of precipitation as $BaSO_4$ according to the following scheme:

Precipitation of $SO_4^{2-}$ is also incomplete due to an increased solubility of $BaSO_4$ in hydrofluoric acid. Furthermore barium carbonate is rather expensive.

Operations of chemical purification of hydrofluoric acid are performed in non-hermetically sealed apparatus; they require separation of precipitates by filtration of a concentrated hydrofluoric acid. This results in substantial losses thereof, pollution of atmosphere with hydrogen fluoride and danger to the health of operation personnel.

Distillation of hydrofluoric acid is conducted in lead or copper apparatus; these metals, however, are insufficiently corrosion-resistant, wherefore the process equipment is subjected to corrosion and the resulting hydrofluoric acid becomes contaminated. Removal of $H_2SiF_6$ during the distillation is achieved after previously converting this acid into $Na_2SiF_6$ which partially remains in the solution. Upon distillation, sodium silicofluoride (as well as fluoride) is deposited on the heat-exchange surface thus necessitating its frequent and labor-consuming cleaning. The most pure hydrofluoric acid is obtained by distillation or rectification in platinum apparatus thus increasing capital investment due to the use of this noble metal.

Also known in the art are methods for purification of hydrofluoric acid from silicofluoric and sulphuric acids, which comprise the use of anion-exchange resins.

Thus, known in the art U.S. Pat. No. 3,383,324, French Pat. No. 1,462,445, French Pat. No. 2,201,247, British Pat. No. 1,126,232 and USSR Inventor's Certificate No. 140,047, are methods in which hydrofluoric acid containing above-mentioned impurities is successively passed through columns filled with a stronglyacidic cation-exchange agent in the H-form and strongly-basic anion-exchange agent in the OH-form, thus resulting in the preparation of deeply-purified acid. Regeneration of the cation-exchange agent is effected by means of hydrochloric acid, while anion-exchange agent is regenerated successively with hydrochloric acid and a solution of NaOH.

According to other prior art methods a mixture of hydrofluoric, sulphuric and silicofluoric acids is subjected to distillation; in doing so, sulphuric acid forms distillation bottoms, while hydrofluoric and silicofluoric acids are passed into the distillate. To separate HF and $H_2SiF_6$ the distillate is passed through a column packed with an anion-exchange agent in the OH-form. From the effluents the fraction is collected which contains pure hydrofluoric acid. The anion-exchange agent is regenerated to remove $H_2SiF_6$ which is effected successively by means of a 2N sulphuric acid and a solution of caustic soda (1N NaOH) to convert the anion-exchange agent into the OH-form. Filtrates from both regeneration stages containing, respectively, $H_2SiF_6$ in a mixture with $H_2SO_4$, and $Na_2SO_4$ in a mixture with NaOH, as well as intermediate washings, are mutually neutralized and discarded.

Both these methods based on separation of acids upon passing same through an anion-exchange agent in the OH-form feature substantial disadvantages:

conversion of an anion exchange agent in each cycle from its salt-form to the OH-form and vice versa by means of an alkali and acid results in an intensive destruction of the anion-exchange agent, since these processes are accompanied by a sharp change in swelling of the resin beads and a substantial temperature rise in the anionite bed;

two-stage regeneration necessitates a high consumption of the acid and alkali which are converted to salts having no future application and discarded; large amounts of water are required for intermediate washing operations, whereby all filtrates are considerably diluted.

Quantitative data for regeneration in the latter of the two above-described prior art methods illustrate that consumption rate of sulphuric acid for regeneration substantially exceeds the stoichiometric amount, i.e. by 5 times (with respect to the content of $SiF_6^{2-}$ in the anionite); consequently, the filtrate, at this stage, contains 4 g.-equiv. of $H_2SO_4$ per 1 g.-equiv. of $H_2SiF_6$, wherefore the opportunity for a practical utilization of the silicofluoric acid is substantially excluded.

Therefore, these prior art processes are economically inefficient; moreover, it is very difficult to perform said processes continuously.

It is an object of the present invention to provide such a method for purification of hydrofluoric acid from silicofluoric acid and/or sulphuric acid which makes it possible to remove said impurities, at any starting concentration thereof, in one stage and with the maximum yield of pure acid.

It is another object of the present invention to provide a method of an ion-exchange purification of hydrofluoric acid from silicofluoric acid, wherein ⅓ of the fluorine being combined in said acid is converted into hydrogen fluoride, thus increasing the yield of pure hydrofluoric acid.

Still another object of the present invention is to provide such a method for purification of hydrofluoric acid which permits the best conditions for a cyclic operation of an anionite under which conditions the anionite remains practically unchanged for lasting service periods.

It is a further object of the present invention to provide a method for an ion-exchange purification of hydrofluoric acid which requires a minimal consumption of low-cost reagents and which permits a practically complete utilization of valuable substances of the starting acid and eliminates the formation of production wastes.

Still a further object of the present invention is to provide a method for purification of hydrofluoric acid which ensures a maximal output of the process equipment due to a short regeneration time and the performing of the process in one stage.

It is another object of the present invention to provide a method for purification of hydrofluoric acid which makes it possible to use low-cost equipment and to perform the process in a tightly sealed and safe apparatus preventing pollution of the atmosphere with volatile harmful compounds.

It is a further object of the present invention to provide a method for purification of hydrofluoric acid which ensures a continuous operation of the process equipment and fully-automated control and regulation thereof.

These and other objects of the present invention are accomplished by a method for purification of hydrofluoric acid, wherein said mixture of acids is contacted with an anion-exchange resin to result in purified hydrofluoric acid, followed by regeneration of the used anion-exchange resin by treatment thereof with a regenerating solution. According to the present invention, the anion-exchange resin is employed in its fluoride form, while the regenerate is an aqueous solution of ammonium fluoride with a concentration ranging from 2 to 10% by weight and pH value ranging from 6 to 9.

An effective purification of hydrofluoric acid from silicofluoric acid and sulphuric acid using anionites in the F-form thereof is due to the difference between constants of acidic dissociation of HF ($7 \times 10^{-4}$) on one hand, and $H_2SiF_6 + H_2SO_4$ (about $10^3$), on the other hand. When passing a solution containing these three acids through a column packed with an anionite in F-form, strong acids are preferentially absorbed displacing F⁻ from the ion exchanger according to the scheme:

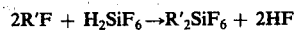
$$2R'F + H_2SiF_6 \rightarrow R'_2SiF_6 + 2HF$$

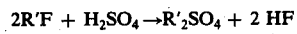
$$2R'F + H_2SO_4 \rightarrow R'_2SO_4 + 2HF$$

(wherein R' is a radical of the functional group of the anionite).

The sorption proceeds equally effectively both at simultaneous presence of the impurities of sulphuric acid and fluorosilicic acid and in the presence of either of said two acids.

At a relatively high (above 0.1N) concentration of sulphuric acid in the starting hydrofluoric acid, a considerable portion of $H_2SO_4$ is additionally absorbed due to the formation of the acidic form on said ion exchanger according to the scheme:

$$R'_2SO_4 + H_2SO_4 \rightarrow 2R'HSO_4$$

Therefore, upon passing contaminated hydrofluoric acid through a column packed with an anionite in its F-form till saturation of the ionite with respect to strong acids there is absorbed at least 1 g.-equiv. of total $H_2SO_4 + H_2SiF_6$ per 1 g.-equiv. of exchanging capacity of the total anionite amount. When hydrofluoric acid is passed through the column till the appearance of traces of strong acids in the pure acid effluent from the column, the amount of absorbed, to this moment, strong acids is less, though under the selected process conditions this decrease is insignificant.

Regeneration of the exhausted anionite containing anions of $SiF_6^{2-}$ and/or $SO_4^{2-}$ is effected by passing a solution of $NH_4F$ through the anionite-packed column. Here the following reactions take place:

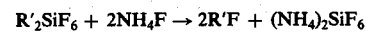
$$R'_2SiF_6 + 2NH_4F \rightarrow 2R'F + (NH_4)_2SiF_6$$

$$R'_2SO_4 + 2NH_4F \rightarrow 2R'F + (NH_4)_2SO_4$$

Preferable concentration of the regenerating solution is varied within the range of from 2 to 10% by weight of $NH_4F$. To effect a complete conversion of the anionite into the F-form, it is necessary to pass through the column a greater volume of the $NH_4F$ solution of a given concentration as compared to the volume corresponding to the stoichiometric calculation. Depending on the chemical nature of functional groups of the anionite as well as on selected values of concentration and flow rate of the solution and on a predetermined regeneration degree, consumption rate of the $NH_4F$ solution can exceed the calculated value by 1.5 to 6 times.

Said limits of $NH_4F$ concentrations in the regenerating solution are determined by the fact that at a concentration of below 2% by weight of $NH_4F$ the regenerating solution volume is considerably increased without, however, any increase in the reagent efficiency, whereas at a concentration above 10% by weight of $NH_4F$ the reagent efficiency is considerably reduced, whereby the reagent consumption rate is substantially increased.

The pH value of the regenerating ammonium-fluoride solution should be varied within the range of from 6 to 9. At a pH value below 6 concentration of $F^-$ ions in the solution is substantially decreased, wherefore the regenerating solution consumption rate is considerably increased. At a pH value above 9 the anion-exchange resin is partially converted, upon regeneration, into the OH-form thus resulting in a substantial elevation of the anionite bed temperature and destruction of the resin upon subsequent purification of hydrofluoric acid.

The method according to the present invention can be performed using resins containing any anion-exchange groups. In any event, to achieve better results, it is advisable to make use of the resins which provide for the most effective ratio of ion-exchange coefficients both in the stage of purification of hydrofluoric acid and in the regeneration stage.

In case of strongly-basic resins containing functional groups of quaternary ammonium bases, preferential absorption of $SO_4^{2-}$ and $SiF_6^{2-}$ anions is very high as compared to that of $F^-$ anion. This favours the process of purification of hydrofluoric acid but hinders regeneration, since a high excess of the $NH_4F$ solution is required for substantial displacement of $SO_4^{2-}$ and $SiF_6^{2-}$ anions.

In the case of weakly-basic resins containing functional amino groups, anion $F^-$ is sorbed preferentially to anions $SO_4^{2-}$ and $SiF_6^{2-}$. However, upon sorption of anions from solutions of acids differing in the ionization degree thereof, a true concentration of anions in the solution becomes the dominant factor. Therefore, anions of strongly dissociated sulphuric and silicofluoric acids are absorbed effectively enough in the presence of weakly-dissociated hydrofluoric acid and the purification process using these anionites is performed with substantially the same success as in the case of using a strongly-basic anionite. On the other hand, during regeneration when all the electrolytes in the system are completely dissociated there are favourable conditions for displacement of $SO_4^{2-}$ and $SiF_6^{2-}$ ions from the resin by $F^-$ anion.

For this reason, it is advisable to perform the process with the use of weakly-basic anionites containing, predominantly or exclusively mono, di- or tri- substituted amino groups.

The process can be also performed using mixtures of resins containing functional groups of quaternary ammonium bases and functional amino groups.

Optimal concentration of the ammonium fluoride regenerating solution which ensures a maximal efficiency of $NH_4F$ as a regenerating agent and, consequently, its minimal consumption is within the range of from 5 to 7% by weight.

It has also been found that the pH value of said $NH_4F$ solution should be above that corresponding to the stoichiometric ratio $NH_3:HF = 1$, since due to hydrolysis of $NH_4F$ a portion of $F^-$ ions at a pH value below 7 is combined into non-dissociated molecules of HF. Increase of the solution pH to 7-8 ensured by a slight excess of $NH_3$ in the solution provides substantially complete conversion of $F^-$ ions into the non-combined active form.

The use of $NH_4F$ as a regenerating agent makes it possible to effectively treat the resulting regenerate by reacting the same with ammonia and obtaining silicic acid and a solution of ammonium fluoride recycled back into the process.

The method according to the present invention for purification of hydrofluoric acid features, as compared to the prior art methods contemplating chemical purification with subsequent distillation, the following advantages:

impurities of fluorosilicic and sulphuric acids are removed in a single stage;

the yield of pure acid is increased;

consumption of the reagents is decreased;

formation of waste products is practically eliminated;

the process can be performed in a tightly sealed and safe apparatus preventing a pollution of the atmosphere with volatile fluorine compounds;

the process can be performed continuously thus enabling its fully-automated control and regulation.

The method according to the present invention also features certain advantages over the prior art methods contemplating the use of anion-exchange resins, i.e.:

the yield of pure acid is increased;

consumption of the reagents and specific volume of the solutions being treated are reduced;

conditions of a repeated use of the anion-exchange resin are substantially improved, wherefore it could be employed in practically unlimited number of production cycles;

output of the ion-exchange unit is increased due to a short regeneration time and performance of the regeneration in a single stage;

formation of the production wastes is practically completely excluded.

The method is technologically simple and performed in the following manner.

Hydrofluoric acid containing impurities of $H_2SiF_6$ and/or $H_2SO_4$ is passed through a standard-type ion-exchange column packed with an anion-exchange resin in the fluoride form. The ratio of the solution flow rate with relation to a full cross-section of the column is established up to 10 cm/min depending on a particular type of anionite and granulometric composition thereof. At the column outlet the purified hydrofluoric acid is collected until impurities of fluorosilicic and/or sulphuric acid are detected in the effluent at a predetermined concentration level thereof.

Then the acid remaining in the column is drained therefrom to give a fraction approaching, in the composition thereof, the starting acid and then it is combined with the latter.

The exhausted anionite is regenerated by way of passing through the column a solution of $NH_4F$ with a concentration ranging from 2 to 10% by weight at a flow rate selected within the same range as in the case of hydrofluoric acid purification. Preferable concentration of $NH_4F$ is selected within the range of from 5 to 7% by weight. The pH value of the regenerating solution is varied within the range of from 6 to 9, preferably of from 7 to 8. Said pH value is obtained by adding the appropriate amount of ammonia into the regenerating solution at pH below 7 and of hydrofluoric acid at pH above 8. The regenerating solution is passed till a decrease in the silicofluoride content therein and/or ammonium sulphate to a predetermined value defined by the desired regeneration level generally selected within the range of from 90 to 99%.

In case of severe requirements imposed on purification degree of hydrofluoric acid, regeneration is conducted by passing the solution through the column in the direction opposite to the movement of the acid to be purified.

In a cyclic process, the anionite after regeneration is washed with water fed counter-current with respect to the movement of the regenerating solution at a flow rate of up to 10 cm/min, whereafter the anionite-packed column is ready to the following process cycle.

There are several embodiments of the process for the regenerate treatment ensuring production of a solution of $NH_4F$ which is then recycled back to the anionite regeneration and for utilization of $SiF_6^{2-}$ ions in the form of valuable by-products. To simplify the flow sheet and for the sake of more simple disclosure, described hereinafter is treatment of a solution containing $(NH_4)_2SiF_6 + NH_4F$, i.e. a regenerate obtained from ion-exchange purification of hydrofluoric acid containing only $H_2SiF_6$ as an impurity. Such simplification is justified by the fact that absorptional hydrofluoric acid contains $H_2SiF_6$ in a substantially greater amount than $H_2SO_4$, wherefore an embodiment of the process taking into account the presence of $SO_4^{2-}$ ions may be illustrated in a specific Example.

As to the separation of exhausted etching solutions containing mainly a dominating amount of sulphuric acid, these solutions should be previously separated by distillation; then, delivered to the ion-exchange purification is only distillate containing a mixture of $HF + H_2SiF_6$.

The regenerate containing $(NH_4)_2SiF_6$ and $NH_4F$ in excess is treated with gaseous ammonia. Here, ammonium silico-fluoride is decomposed:

$$(NH_4)_2SiF_6 + 4 NH_4OH \rightarrow 6 NH_4F + Si(OH)_4 \downarrow$$

Precipitate of silicic acid is settled, filtered and delivered for processing into a product containing silica. The mother liquor, wherein $NH_4F$ concentration is about 2 times as high as in the solution employed for regeneration is divided into two portions, wherefrom one portion (I) after being appropriately diluted is delivered to the anionite regeneration, while another portion (II) is delivered to treatment for the fluoride precipitation and distilling-off ammonia. The ratio between volumes of (I) and (II) is equal to the ratio of (mF$^-$ + ⅓ nSiF$_6^{2-}$) : (⅔ n SiF$_6^{2-}$), wherein $m$ and $n$ is the number of g.-equiv. of ions F$^-$ and SiF$_6^{2-}$ in the regenerated delivered to the treatment.

Thus, in a cyclic process 2 g.-equiv. of F— ion contained in H$_2$SiF$_6$ are converted into the form of free hydrogen fluoride and added to HF contained in the starting acid, i.e. the latter is purified from SiF$_4$ rather than H$_2$SiF$_6$.

Solution (II) containing $NH_4F$ in the amount corresponding to the content of SiF$_4$ in the starting acid and in the regenerate is processed according to one of the following embodiments which is selected depending on the particular process conditions. Common objects of these operations reside in liberation of free ammonia recycled to the regenerate treatment and precipitation of the fluoride ion in the form of sparingly soluble compounds.

According to the first embodiment a solution of $NH_4F$ is treated with sodium carbonate (or hydroxide):

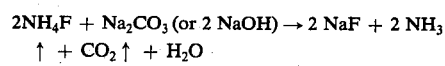

According to the second embodiment a solution of $NH_4F$ is treated with sodium aluminate or with a mixture of sodium base and aluminium oxide (hydroxide)

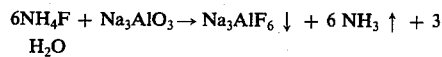

According to the third embodiment a solution of $NH_4F$ is treated with calcium hydroxide (lime milk):
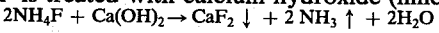

Sodium fluoride and cryolite are commercial products and calcium fluoride is subjected to treatment along with the fluorite concentrate.

It might be advantageous to use various combinations and modifications of the above-described embodiments. Thus, upon successive precipitation of NaF and CaF$_2$ the major portion of fluoride can be recovered in the form of commercial sodium fluoride, while the remaining portion is substantially completely precipitated in the form of sparingly soluble CaF$_2$.

Specific examples given hereinbelow briefly illustrate only the former embodiment, since all the above-described operations are known from the literature and commercial practice.

If the starting hydrofluoric acid contains also H$_2$SO$_4$, in addition to H$_2$SiF$_6$, then the regenerate contains a mixture of salts $(NH_4)_2SiF_6 + (NH_4)_2SO_4 + NH_4F$ and the solution after treatment with ammonia contains a mixture of $NH_4F$ and ammonium sulphate.

In the majority of practical cases where the content of sulphuric acid in the starting acid is by many times less than the content of H$_2$SiF$_6$, the process scheme remains the same including recycling the solution (I) to the anionite regeneration, since at the ratio between ammonium fluoride and ammonium sulphate exceeding 1 (in g.-equiv.), the presence of SO$_4^{2-}$ does not exert any substantial influence upon the regeneration results.

To obtain a deeply purified hydrofluoric acid, the last layer of the anionite bed should be converted into the pure F$^-$-form; to this end, the final regeneration stage is effected by means of a pure solution of NH$_4$F; consumption of this latter solution may be as high as about 10% of the volume of solution (I).

Treatment of the solution (II) in this case is conducted using any of the above-described embodiments, in the third embodiment employed either separately or in a combination with the pre-treatment of the first or second embodiment the precipitate comprises a mixture of CaSO$_4$. 2H$_2$O + + CaF$_2$; this mixture is also delivered to the treatment together with the fluorite stock.

In the case where H$_2$SO$_4$ is a predominant impurity in the starting hydrofluoric acid but its absolute concentration is not high so that the pre-distillation is inexpedient, the purification of hydrofluoric acid is conducted in a manner similar to that described hereinabove but without the regenerate treatment with ammonia. The regenerate is treated, for example as in the first and third embodiments in succession:

$$2NH_4F + Na_2CO_3 \rightarrow 2NaF \downarrow + 2NH_3 \uparrow + CO_2 + H_2O$$

$$(NH_4)_2SO_4 + Ca(OH)_2 \rightarrow CaSO_4 \downarrow + 2NH_3 \uparrow + 2H_2O$$

Total amount of the evolved ammonia is absorbed by means of a diluted hydrofluoric acid in the presence of $NH_4F$ and the resulting $NH_4F$ solution is delivered to the anionite regeneration.

The above-described operations are completed by water washing of the anionite and precipitates in order to displace the solution from the layer of the sorbent or precipitate. Water washing of the anionite under conditions of continuous operation of a series of columns requires a minimal water consumption sufficient to prevent intermixing of the regenerating solution and the acid being purified which remain in the columns after appropriate operations of the ion-exchange cycle.

To wash the anionite after the operations of the acid purification and regeneration, water volumes are consumed which are equal to 0.3–0.5 of the anionite volume in the column, whereas in the washing of precipitates of silicic acid and fluorides water consumption is equal to 1–2 volumes of said precipitates. The washing solutions are recycled back into the process as it generally takes place in the ion-exchange technology. For example, the remainder of the regeneration solution displaced from the column packed with the anionite during the washing thereof is recycled to further operations of regeneration.

To perform a continuous process of purification of hydrofluoric acid use is made of at least 3 series-connected columns packed with an anionite, each of said columns is successively employed for the steps of acid purification, washing, regeneration, and washing again.

For a better understanding of the present invention, some specific examples are given hereinbelow by way of illustration without, however, limiting all possible embodiments of the method according to the present invention. Unless otherwise specified, in all the Examples amounts of the reagents are expressed in percent by weight.

EXAMPLE 1

As the anionite use is made of an anion-exchange resin prepared by polycondensation of polyethylenepolyamines and epichlorohydrine. The resin contains functional groups of secondary and ternary amines as well as quaternary ammonium groups. Total exchange capacity of the anionite is 9.7 mg-equiv./g of the dry resin in the OH-form including the content of strongly-basic quaternary groups equal to 1.2 mg.-equiv./g. of the dry resin in the OH-form.

The resin is converted into F-form by treating the OH-form with a pure diluted hydrofluoric acid and then washing with water.

500 ml of wet resin containing 140 g of dry resin are placed into a column made of a transparent plastic and having an inside diameter of 40 mm. The anionite bed height is 400 mm.

A solution containing 42.5% of HF and 5.0% of $H_2SiF_6$ is passed through the column downwardly at the rate of 30 ml/min (linear velocity of the solution divided by the total cross-section area of the column is 2.5 cm/min).

Successive effluent fractions contain: 200 ml of water, 300 ml of a solution with the average concentration of 15% HF, 1.8 liters of the solution containing 44.3% of HF and below 0.01% of $H_2SiF_6$.

Thereafter, through the anionite there are passed, at the same flow rate, 400 ml of water to displace the acid and 400 ml of a solution are obtained which solution contains 30% of HF and 2.5% of $H_2SiF_6$ (this solution is employed in the following cycle, wherein it is passed first through the column with the anionite in its F-form).

To regenerate the anionite, through the column there is passed, at the same flow rate, a solution containing 5% of $NH_4F$ and having pH = 7.5. Successive effluent fractions of the effluent contain: 100 ml of the solution containing, on the average, 10% of HF and 1% of $H_2SiF_6$; 250 ml of the solution containing, on the average, 0.5% of $NH_4F$ and 1.5% of $(NH_4)_2SiF_6$; 2.0 liters of the solution containing 2.3% of $NH_4F$ and 6.2% of $(NH_4)_2SiF_6$ (the last 100 ml portion of this solution contains 4.9% of $NH_4F$ and 0.2% of $(NH_4)_2SiF_6$).

The anionite is washed with 400 ml of water to give 400 ml of the solution containing 3% of $NH_4F$ and 0.05% of $(NH_4)_2SiF_6$. Thereafter, the anionite is employed in the following cycle of purification of hydrofluoric acid which is performed under the same process conditions and gives the same results.

Into the regenerate in the amount of 2 liters containing 2.3% of $NH_4F$ and 6.2% of $(NH_4)_2SiF_6$ there are added, under stirring, 600 ml of an aqueous solution of ammonia containing 10% of $NH_3$. The residue of silicofluoric acid is filtered-off to give 2.3 liters of a solution containing 8% of $NH_4F$. The residue is washed with 600 ml of water to give 300g of silicofluoric acid and 650 ml of a solution containing 2.8% of $NH_4F$. The mother liquor and washing solution are combined to give 2.95 liters containing 7% of $NH_4F$.

1.25 liter of the resulting solution (7% $NH_4F$) are mixed with 0.4 liter of the solution (3% of $NH_4F$) resulting from the anionite washing after regeneration and 0.35 liter of water to give 2 liters of a solution containing 5% of $NH_4F$ and delivering to the anionite regeneration.

The remaining amount of the solution after the step of recovering silicic acid (1.7 liters with the content of $NH_4F$ of 7%) is treated with soda (180 g of $Na_2CO_3$) upon heating to reflux. The liberating ammonia is absorbed with water to give 600 ml of the solution containing 10% of $NH_3$ (this solution is employed for recovering silicic acid from the regenerate). The mother liquor is filtered to separate it from the residue of NaF. As a result, there are obtained 25 g of sodium fluoride and 1.2 liter of a solution containing 4% of NaF (this solution may be used, under the commercial production conditions, for the production of cryolite).

EXAMPLE 2

To perform purification of hydrofluoric acid from such impurity as sulphuric acid, use is made of the same anionite in the same amount as in the foregoing Example 1.

Through a column packed with the anionite a solution is passed downwardly containing 41.3% of HF and 1.2% of $H_2SO_4$ at the flow rate of 30 ml/min.

Successive fractions of the effluent contain: 220 ml of water; 300 ml of the solution containing, one the average, 17% of HF; 5.0 liters of the solution containing 41.7% of HF and below 0.003% of sulphuric acid.

After detection in the filtrate of traces of sulphuric acid (above 0.02% of $H_2SO_4$), the remaining portion of hydrofluoric acid is displaced with water and regeneration is then conducted under the conditions similar to those described in the foregoing Example 1. Successive fractions of the effluent have compositions similar to those of the effluent fractions obtained in the regeneration performed in the foregoing Example 1, though instead of ammonium silicofluoride ammonium sulphate is contained in the present case.

The regenerated anionite is washed with water employed in the following cycle of purification of hydrofluoric acid which cycle is performed under the same conditions and with the same results.

The regenerate in the amount of 2.2 liters containing 2.1% of $NH_4F$ and 4.9% of ammonium sulphate is mixed with 1.2 liter of an aqueous suspension of Ca-$(OH)_2$ containing 70 g/l of CaO upon heating to the temperature of 80° C. The liberating ammonia is absorbed by a solution of HF + $NH_4F$ and the resulting solution of ammonium fluoride is employed in the following cycles of the anionite regeneration process. The residue containing 110 g of $CaSO_4$ and 50 g of $CaF_2$ can be employed for the preparation of HF along with the fluorite stock. The mother liquor (about 2.5 liters) contains 20 mg/l of $F^-$ ions and 1 g/l of $SO_4^{2-}$ which permits its use as a return water either directly or after conventional ion-exchange desalination.

EXAMPLE 3

For the purification of hydrofluoric acid from impurities of $H_2SiF_6$ and sulphuric acid use is made of the same anionite and in the same amount as in the foregoing Example 1.

Through a column packed with the anionite a solution is passed downwardly containing 42.2% of HF, 3.6% of $H_2SiF_6$ and 1.0% of $H_2SO_4$ at the flow rate of 24 ml/min (linear velocity of the solution is 2 cm/min).

Successive fractions of the filtrate contain: 230 ml of water; 300 ml of the solution containing 18% of HF; 1,900 ml of the solution containing 44.2% of HF, below 0.01% of $H_2SiF_6$ and below 0.01% of sulphuric acid.

The anionite regeneration is conducted under conditions similar to those described in Example 1 hereinbefore. The anionite after regeneration is employed in the following process cycle which is performed under the same conditions and with the same results.

The regenerate in the amount of 2.2 liters containing 2.3% of $NH_4F$, 4.3% of $(NH_4)_2SiF_6$ and 1.3% of $(NH_4)_2SO_4$ is treated with 500 ml of an aqueous solution containing 10% of ammonia.

A portion of the solution resulting from the regenerate treatment with ammonia and separation of silicic acid is delivered directly to the anionite regeneration in one of the cycles of the process for purification of hydrofluoric acid. This regenerating solution contains 5% of $NH_4F$ and 0.8% of ammonium sulphate. During regeneration this solution is passed through the column till no traces of $SiF_6^{2-}$ ion are detected in the effluent and then the anionite is finally regenerated with a pure 5% solution of $NH_4F$, consumption rate of the latter solution constitutes 1/5 of the consumption rate without using the return solution.

EXAMPLE 4

Use is made of an anion-exchange resin prepared by polycondensation of polyethylenepolyamines and phenols. The resin contains functional groups of secondary and tertiary amines. Total exchange capacity of the anionite is 8.5 mg.-equiv./g of the dry resin in its OH-form. Into a column there are placed 430 ml of the wet resin in the F-form which corresponds to 140 g of dry resin.

A solution to be purified contains 42.5% of HF and 5.0% of $H_2SiF_6$. All the process conditions are similar to those described in Example 1 hereinbefore.

The product fraction of the purified acid has the volume of 1,400 ml and contains 44.1% of HF and below 0.01% of $H_2SiF_6$.

The regeneration data (regeneration is performed by means of a 5% solution of $NH_4F$) do not practically differ from the data obtained in Example 1 hereinbefore.

EXAMPLE 5

Use is made of an anion-exchange resin prepared by copolymerization of styrene and divinylbenzene, followed by treating the copolymer with methylchloride and trimethylamine. The resin contains functional groups of a quaternary ammonium base. Total exchange capacity is 4.2 mg-equiv./g of dry resin in its OH-form including the content of strongly-basic functional groups equal to 3.8 mg-equiv./g of the dry resin in its OH-form.

Into a column with the inside diameter of 40 mm there are placed 500 ml of the wet anionite in the F-form which corresponds to 210 g of the dry resin.

A solution to be purified contains 42.5% of HF and 5% of $H_2SiF_6$. The process conditions are similar to those described in Example 1 hereinbefore.

The product fraction of the acid has its volume of 1,200 ml and the following composition: 43.8% of HF and below 0.01% of $H_2SiF_6$.

The consumption of a 5% solution of $NH_5F$ for regeneration is 4.5 liters. Average composition of the regenerate is the following: 4.2% of $NH_4F$ and 1.7% of $(NH_4)_2SiF_6$. The degree of utilization of $NH_4F$ upon regeneration is 16% which is by 3.5 times less than in Example 1 hereinbefore.

EXAMPLE 6

Use is made of an anion-exchange resin prepared by polycondensation of trimethylolmelamine and containing secondary and primary amino groups. Total exchange capacity (with respect to 0.1N HCl) is 5.1 mg.-equiv./g of the dry resin in the OH-form.

Placed into a column are 500 ml of the wet anionite in the F-form (250 g of the dry resin).

A solution to be purified contains 42.5% of HF, 1.5% of $H_2SiF_6$ and 1% of $H_2SO_4$. The process conditions are similar to those described in Example 1 hereinbefore.

The product fraction of the acid has its volume of 2,700 ml and the following composition: 43.5% of HF, below 0.01% of $H_2SiF_6$ and below 0.01% of sulphuric acid.

The consumption of $NH_4F$ solution for the regeneration is 2.8 liters. Average composition of the regenerate is as follows: 3.3% of $NH_4F$, 1.8% of $(NH_4)_2SiF_6$, 1.2% of ammonium sulphate. The degree of utilization of $NH_4F$ in the regeneration is 34%.

EXAMPLE 7

A process cycle is performed under the conditions similar to those described in Example 1 hereinbefore, but using for the regeneration of the anionite a solution containing 2% of $NH_4F$. After the regeneration there are contained 6 liters of the solution containing 1.2% of $NH_4F$ and 2.0% of $(NH_4)_2SiF_6$.

EXAMPLE 8

A process cycle is performed under the conditions described in the foregoing Example 1, but using for the regeneration of the anionite a solution containing 10% of $NH_4F$. After the regeneration there are obtained 1.8 liters of the solution containing 6.9% of $NH_4F$ and 7% of $(NH_4)_2SiF_6$.

EXAMPLE 9

A process cycle is performed under the conditions similar to those described in Example 1 hereinbefore, but the pH value of the regenerating solution is 6. After the regeneration there are obtained 3.0 liters of the solution containing 3.2% of $NH_4F$ and 4.1% of $(NH_4)_2SiF_6$.

EXAMPLE 10

A process cycle is performed under the conditions similar to those described in Example 1 hereinbefore, but the pH value of the regenerating solution is 9. The same results as in the foregoing Example 1 are obtained, but there is observed a considerable heating of the anionite bed in the region of movement of the regenerating solution front through the column.

What is claimed is

1. A method for purification of hydrofluoric acid from acids selected from the group consisting of silicofluoric and sulphuric acids which comprises contacting a mixture of said acids with an anion-exchange resin in the fluoride form thereof to obtain a purified hydrofluoric acid; treating the exhausted anion-exchange resin with a regenerating solution comprising an aqueous solution of ammonium fluoride having a concentration ranging from 2 to 10% by weight and a pH value ranging from 6 to 9.

2. A method as claimed in claim 1, wherein as the anion-exchange resin in the fluoride form use is made of resins containing functional groups of quaternary ammonium bases.

3. A method as claimed in claim 1, wherein as the anion-exchange resin in the fluoride form use is made of resins containing functional amino groups.

4. A method as claimed in claim 1, wherein use is made, as the anion-exchange resin in the fluoride form, of mixtures of resins containing functional groups of quaternary ammonium bases and functional amino groups.

5. A method as claimed in claim 1, wherein use is made of an aqueous solution of ammonium fluoride having a concentration ranging from 5 to 7% by weight.

6. A method as claimed in claim 1, wherein use is made of an aqueous solution of ammonium fluoride having a pH value ranging from 7 to 8.

7. Method according to claim 1 and wherein said method is effected in apparatus sealed from the atmosphere.

* * * * *